Nov. 29, 1966 K. SARGENT 3,288,260
CARRIAGE SPEED GOVERNING MEANS FOR TYPEWRITERS
Filed Dec. 12, 1963
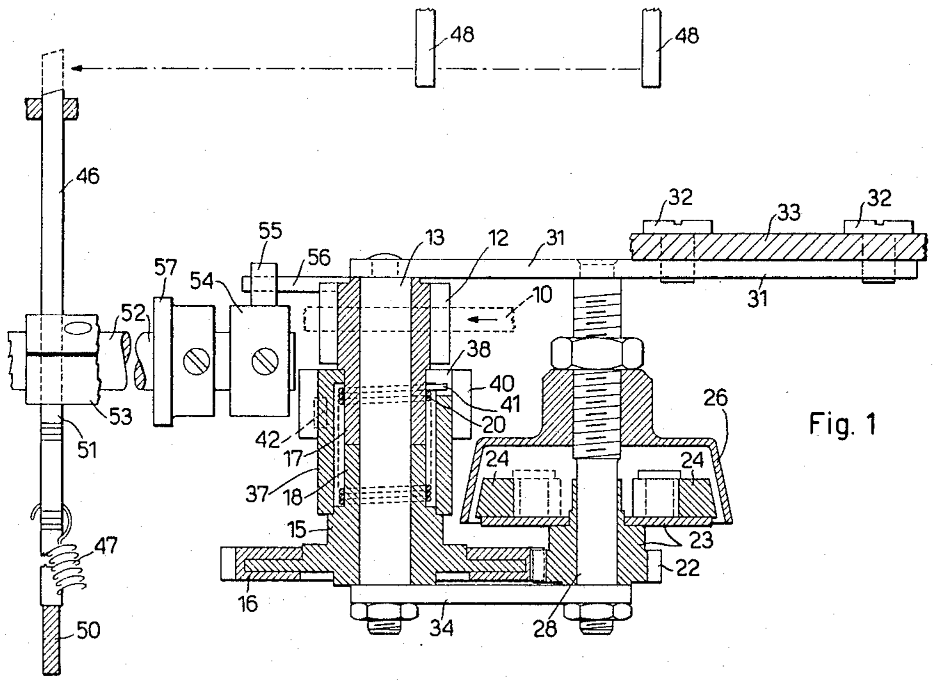
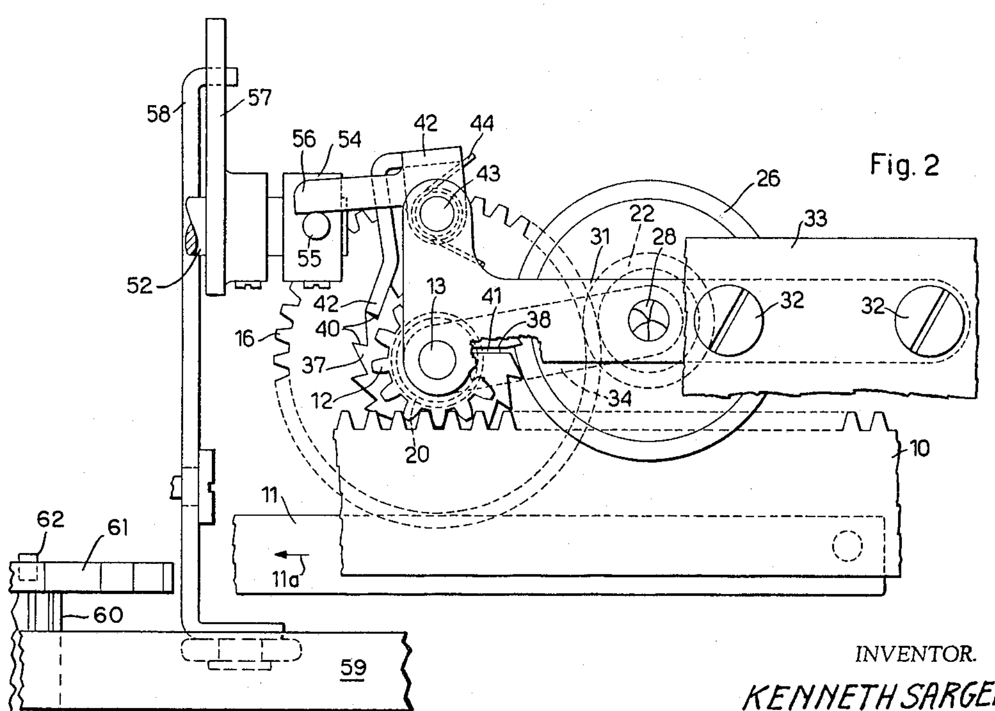
INVENTOR.
KENNETH SARGENT
BY John Toggenburger
AGENT United States Patent Office 3,288,260
Patented Nov. 29, 1966

3,288,260

CARRIAGE SPEED GOVERNING MEANS FOR TYPEWRITERS

Kenneth Sargent, Windsor, Conn., assignor to Olivetti Underwood Corporation, New York, N.Y., a corporation of Delaware Filed Dec. 12, 1963, Ser. No. 330,046
4 Claims. (Cl. 197—64)

This invention relates to typewriters and similar machines, and more particularly to carriage driven governors and control mechanisms therefor for slowing the carriage during tabulations, but not otherwise, thereby to prevent damaging impact and undue noise.

It is a principal object of the invention to control a carriage speed governor for action efficiently through use of a simple spring-species clutch and a simple control mechanism, in a manner and so that the speed governor is driven only incidental to tabulations.

It is another object, adjunct to the foregoing one, to provide a control mechanism efficiently cooperative with a spring clutch to render it operative without itself imposing a tabulation varying load on the governor.

Other objects and features will become evident from the detailed description which follows, and in conjunction with the drawings.

In the drawings, FIGURE 1 is a front view partially in sectional aspect which shows the speed impeding governor and controlling mechanism therefor.

FIGURE 2 is a plan view showing generally the mechanism shown in FIGURE 1.

The carriage of the typewriter is represented by a rack bar 10. During advances of the carriage in letterfeed direction, the rack bar 10 is drawn leftwardly by a bias means represented by a spring-biased draw band 11 having an arrow 11[a] noted thereon, indicating the direction of bias. However, a usual escapement restrains the carriage normally against advance. A pinion 12 rotatively carried on a stationary stud 13 is in constant mesh with said rack bar 10. Also rotatively carried on said stud 13 is an element 15 including a gear 16 of light-weight plastic material unitary therewith. Said pinion 12 and said element 15 include respectively drums 17, 18 of substantially equal diameter whereon there is a helical clutch spring 20. As will be brought out later, said clutch spring 20 is constituted and controlled so as to transmit motion from the drum 17 to the drum or element 18 only incidental to tabulating advances of the carriage, that is leftward motions of the rack bar 10 at tabulations. When so rotated, the element 15, through its large gear 16, rotates at a high speed ratio a pinion 22, the latter being part of a rotor assembly 23 which also includes centrifugal fly-weights 24 for frictional contact with the interior of a tapered stator drum 26. It thus follows that the fly-weights 25, through centrifugal action during tabulating advance of the carriage, establish a speed-responsive braking connection between the rotor and said stator.

The stator is adjustably carried on the stud 28 by threaded association into varying speed controlling relations with the fly-weights 24. The studs 13 and 28 are each fastened to a plate 31 by riveting them thereto, and the plate in turn is fastened by screws 32 to a member 33 of the machine frame work. A bridging plate 34 ties the studs 13, 28 at their lower ends and locates the parts 15 and 22.

The helical clutch spring 20 is leftwardly wound and near its upper end has at least one of its turns in light frictional contact on the drum 17. The remainder of the turns on the drum 17 may be slightly loose or bearing thereon lightly. This provides that whenever the carriage moves in feed direction and thus rotates the dum 17 clockwise, the clutch spring, by reason of the frictional contact with at least one spring turn, tends to wind into clutching hold on said drum. However, whenever the carriage is moved in return direction the drum 17 moves counterclockwise, that is in a clutch loosening direction so that then no motion transmittal results. The turns on the drum 18 are of a size relatively thereto so as to have a forced fit thereon and therefor to transmit any tabulating motion readily therefor.

As annular sleeve member 37, constituted of a light-mass plastic material, is mounted in a coaxial relationship on said drum 17 and the element 15. Such member 37 has a radial slot 38 whereinto there reaches an outwardly bent terminal end 41 of the clutch spring 20. Closely spaced peripheral teeth 40 on the member 37 are normally engaged by a pivoted pawl structure 42 preventing rotation of said member. Such engagement prevails at all times, except incidental to tabulation of the carriage. Therefore, at all times except incidental to tabulations the annular member is in control of the terminal end of the spring to suppress the frictional dragging of the clutch spring into a clutching hold. However, when the machine is controlled for the carriage to execute tabulating runs, in a manner yet to be stated, then said pawl structure 42 is released so that then the annular member 37 facilitates freely the clutch spring 20 to take a self clutching hold. Said pawl structure 42 is pivotally borne on a stud 43, downreaching from the plate 33, and thereon is urged to active position by a torsion spring 44.

In FIGURE 1, the device of the invention is illustrated to be controlled by a tabulating mechanism conventionally used in Underwood Standard typewriters. A tabulator reed 46 is shown in a lowered, normal position whereto it is biased by a restoring spring 47. Projection of the reed 46 into tabulation controlling range of carriage-borne tabulating stops 48 results from an operation of a tabulator key of whch only a rear portion 50 is shown. Upon projection of the reed, a finger 51 thereof rocks a shaft 52 through an arm 53 thereon. A collar 54 on the shaft, adjustably secured thereto, and having a pin 55 thereon consequently will swing the latter rearwardly and will act on an arm 56 of the pawl structure 42 to swing the latter clear of the teeth 40. Tabulating movement results in view of an arm 57 on the shaft 52 which in a conventional manner acts on a carriage release member 58 to lift a conventional carriage-carried rack 59 out of mesh with a gear pinion 60 which in a usual manner is associated with an escapement wheel 61. Escapement dog means indicated at 62 and cooperative with said escapement wheel 61 normally exercise letter-feed control over the carriage through said pinion 60 and rack 59.

The reed 46 is restored at the conclusion of the tabulating run at which time said pawl structure 42 reassumes control over the annular member 37 to prevent clutch closure.

It should be observed that the tabulating control mechanism during the tabulating motion of the carriage has no motion impeding influence whatever on the speed governor so that the latter is functioning speed responsively without variating influences.

What is claimed is:

1. In a business machine having a carriage movable on a frame for advance and return travel, means to bias the carriage to advance and normally effective carriage advancement restraining means, the combination with a tabulation controlling mechanism which is operable to release said restraining means to cause tabulating advancement of the carriage by said biasing means to given tabulated positions, of carriage braking means to govern the speed of advance of the carriage during tabulations, comprising:

a rotor, a stator correlated with said rotor, centrifugal fly-weight means associated with said rotor to establish a carriage-speed-responsive braking connection between said rotor and stator during tabulating advance of the carriage, an element turnably entrained with said rotor, a clutch drum constantly entrained with the carriage for rotation thereby, a helical clutch spring, said element, said drum and said clutch spring coaxially arranged and the latter having turns associated with and directionally correlated to said drum and including at least one in light frictional contact therewith, so that there is normally a tendency for self-clutching action of the clutch spring to said drum at advance travel of the carriage, said clutch spring always adapted to drive said element when it is driven by said drum, a member turnably mounted in coaxial relationship to said drum and having an annular-row of teeth for effecting clutching control over said clutch spring, a control association of said member with that end of the spring which has a turn in light frictional contact with said drum, whereby if during carriage advance travel the said member is held against rotation with said drum, the said clutch spring is incapable of self-clutching action, means normally in engagement with the teeth of said member to hold the latter against rotation during carriage advance travel other than tabulating travel, and means controlled by said tabulation controlling mechanism, when operated, to release said holding means for the durations of tabulating advancements of the carriage, whereby for such durations the clutch spring is enabled for self-clutching action and the carriage consequently is subject to fly-weight controlled braking action.

2. In a business machine having a carriage movable on a frame for advance and return travel, means to bias the carriage to advance and normally effective carriage advancement restraining means, the combination with a tabulation controlling mechanism which is operable to release said restraining means to cause tabulating advancement of the carriage by said biasing means to given tabulated positions, of means to govern the speed of advance of the carriage during tabulations, comprising:

a rotor, a stator correlated with said rotor to impose a speed reducing load thereon, an element turnably entrained with said rotor, a clutch drum constantly entrained with the carriage for rotation thereby, a helical clutch spring, said element, said drum and said clutch spring coaxially arranged and the latter having turns associated with and directionally correlated to said drum and including at least one in light frictional contact therewith, so that there is a tendency for self-clutching action of the clutch spring to said drum at advance travel of the carriage, said clutch spring always adapted to drive said element when it is driven by said drum, an annular member mounted to turn freely in coaxial relationship to said drum but having a loose associating connection with said clutch spring near the end at said drum, releasable means to hold said member from rotating, thereby to suppress through said connection said self clutching action of said clutch spring, and means controlled by said tabulation controlling mechanism to release said holding means substantially for the duration such controlling mechanism is operated.

3. The invention set forth in claim 2, said annular member comprising a ring of teeth, and said holding means comprising a releasable pawl normally engaging said ring of teeth.

4. The invention set forth in claim 3, said annular member surrounding said clutch spring with clearance along its full length and therebeyond being turnably borne respectively on said drum and said element.

References Cited by the Examiner

UNITED STATES PATENTS

| | | | |
|---|---|---|---|
| 903,765 | 11/1908 | Pfunder | 197—64 |
| 919,020 | 4/1909 | Josleyn | 197—64 |
| 2,236,608 | 4/1941 | Pitman | 197—64 |
| 2,340,491 | 2/1944 | Sagner | 197—64 |
| 2,829,754 | 4/1958 | Norcross | 197—64 |
| 2,854,124 | 9/1958 | Dodge et al. | 197—183 |
| 2,973,078 | 2/1961 | Templeton et al. | 197—17 |
| 3,212,616 | 10/1965 | Frechette et al. | 197—17 X |

ROBERT E. PULFREY, *Primary Examiner.*

DAVID KLEIN, *Examiner.*

E. WRIGHT, *Assistant Examiner.*